Oct. 9, 1923.
M. A. MARQUETTE
1,470,465
MANUFACTURE OF BEAD FILLERS
Filed Jan. 27, 1921
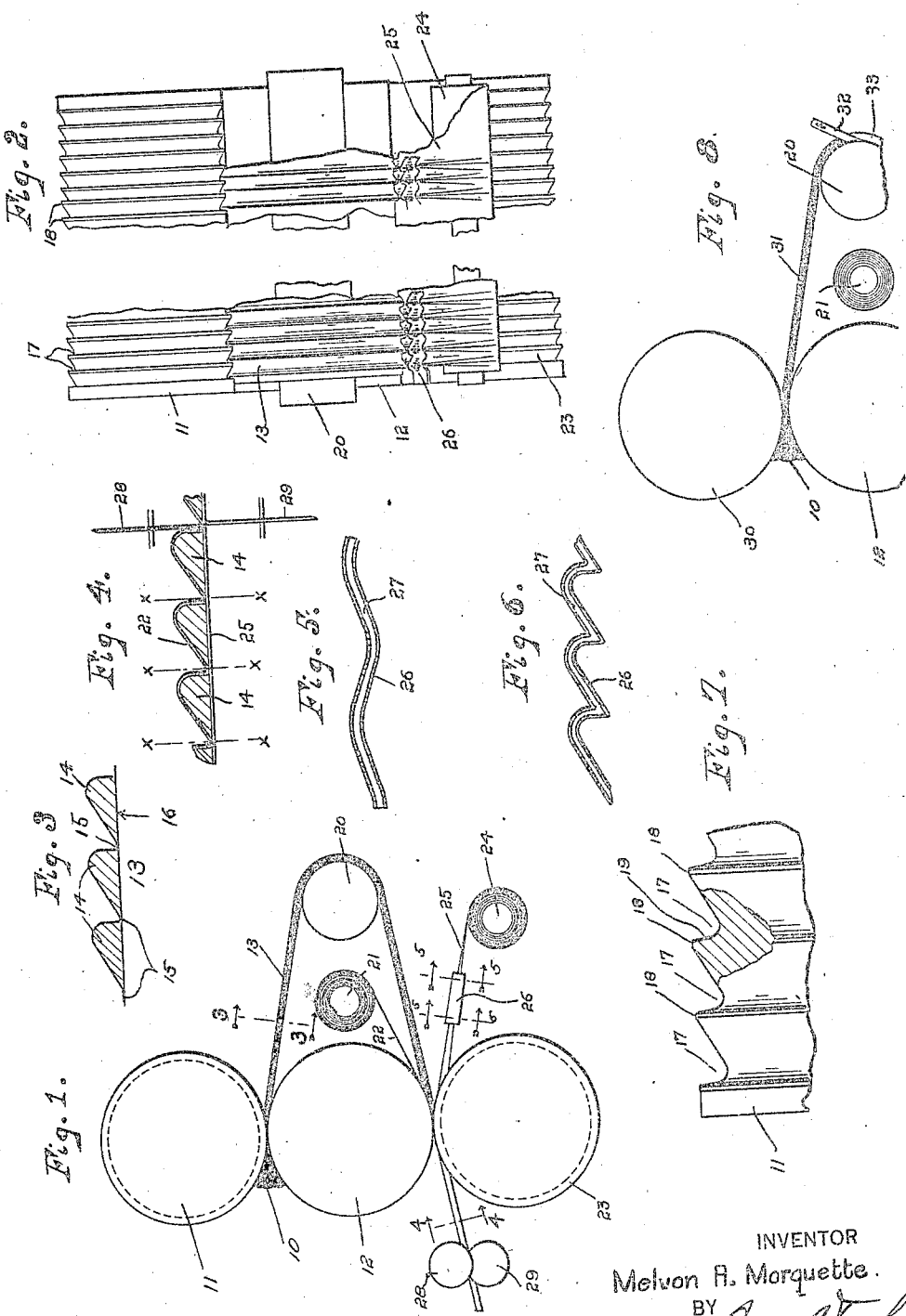
INVENTOR
Melvon A. Marquette.
BY
ATTORNEY Patented Oct. 9, 1923.

1,470,465

UNITED STATES PATENT OFFICE.

MELVON A. MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

MANUFACTURE OF BEAD FILLERS.

Application filed January 27, 1921. Serial No. 440,278.

*To all whom it may concern:*

Be it known that I, MELVON A. MARQUETTE, a citizen of the United States of America, residing at Chicopee Falls, in the county of Hampden and State of Massachusetts, have invented certain new and useful Improvements in the Manufacture of Bead Fillers, of which the following is a specification.

My invention relates to a method and a machine for making bead fillers, at once more rapid and economical than methods and machines now existing.

In former methods of manufacturing bead fillers (which it will be understood signifies relatively hard rubber cores, usually covered with fabric, to be inserted in the bead edges of tire casings, particularly those of the clincher type) the fillers have been made individually by a succession of individual operations. The rubber cores themselves were usually formed in an extrusion machine as a long rod of indefinite length. This rod was then either run through a covering machine, in which a strip of fabric was folded around the rod so as to completely enclose it; or was cut to length and rolled over a strip of fabric so as to cause the strip to be wound upon the cut rod. Both of these methods deal with single elements at a time, and have the disadvantage, besides their natural slowness, of requiring a duplication of equipment in case the capacity demanded is greater than that of a single unit.

It is the particular object of my invention to provide a method and a machine whereby a large number of bead fillers may be constructed rapidly in a single operation; and my invention has added utility in cases where the bead fillers are to be covered with fabric, as by my improved mode of manufacture I am enabled to apply the fabric simultaneously by a single covering unit to a plurality of bead fillers, and to do this in a continuous process with the formation of the bead fillers themselves.

Briefly stated, my invention consists in making a plurality of bead fillers in a web or sheet in which the bead fillers are held together by thin webs of material, and then severing the webs between the individual bead fillers. By this mode of procedure I am enabled to make a very large number of bead fillers in the time previously required for the manufacture of a single filler. Furthermore, if a fabric covering upon the bead filler is desired, this mode of procedure permits of the application of the fabric substantially simultaneously with the formation of the fillers. In practicing the invention I contemplate forming a wide sheet of rubber compound, of which the bead filler is mainly constructed, with ribs or corrugations corresponding approximately to the shape of the bead fillers and joined together by thin webs of rubber. This may conveniently be done by passing a mass of rubber through calender rolls presenting between them a plurality of grooves, or by any other means known or desired for forming rubber into shaped sheets, such as the usual tubing die. A sheet of fabric, usually bias cut, is then pressed against each face of this web, the fabric being preferably previously shaped to the form of the ribs. The assembly is now given a final forming pressure, as by being pressed between another pair of rolls having suitable forming grooves.

Referring now to the preferred embodiment of my invention, it will be described with particular reference to the accompanying drawings, in which—

Fig. 1 is a diagrammatic end view of a calender by which my invention may be practiced;

Fig. 2 is a partial elevation thereof, looking from the right in Fig. 1;

Fig. 3 is a section on line 3—3 of Fig. 1;

Fig. 4 is a section on line 4—4 of Fig. 1, also showing one manner in which the web between adjacent bead fillers may be severed;

Fig. 5 is a section on line 5—5 of Fig. 1;

Fig. 6 is a section on line 6—6 of Fig. 1;

Fig. 7 is a detail, on a larger scale, of one of the grooved rolls shown in Fig. 2; and Fig. 8 is a view similar to Fig. 1 showing a slightly modified construction.

A mass of rubber 10 is worked between cylinders or calender rolls 11 and 12 into a sheet 13 having longitudinal ribs 14 separated by thin webs 15. These ribs are of substantially the shape of the final bead filler, and are held in sheet form by the webs. The cylinder, or calender roll, 12 is preferably smooth, so that the sheet 13 will have a smooth surface 16, while the upper roll 11 has annular depressions 17 separated by web-forming portions 18. Preferably, in order to insure that the sheet 13 will readily strip from the calender roll, the sides 19 of the depressions are made slanting, as shown in Fig. 7.

The sheet so formed is passed around a guide roll 20 spaced from the calender so as to provide space for a spool 21 carrying fabric 22 (usually bias-cut), and is then presented between roll 12 and a roll 23 grooved in a similar manner to roll 11. A second spool 24 supplies fabric 25, which is passed through a guide 26 presenting a hollow guiding interior 27 constructed, as shown in Figs. 1, 5 and 6, so as to take the flat fabric and fold it to approximately the shape of the undulating surface of sheet 13. As sheet 13 passes between rolls 12 and 23 it is covered on its opposite sides with fabric 22 and 25 respectively, and is pressed firmly in this assembled relation by the rolls. The product thus formed is shown in Fig. 4, and may be severed at this point by cutters 28 and 29 along lines X—X or may be vulcanized while still in the sheet form. Also the further operations of buffing and cementing, usually performed before the bead filler is built into a tire, may be carried out while the fillers are still in the assembled sheet form, or the fillers may be separated first, as desired.

In Fig. 8 I have illustrated a slight modification of the method of procedure. Instead of forming roll 11 with annular depressions, I employ a roll 30 with a smooth surface slightly spaced from roll 12 and coacting therewith to produce a sheet 31 of substantially uniform thickness. As this sheet passes over roll 20 it is cut by a series of cutters 32 into strips 33 of sufficient cross-sectional area to fill the space between the opposed fabric sheets as these pass between the rolls 12 and 23, which are of the same construction as in the preferred method. In this latter case the bead fillers will be held in their sheet or web form by the fabric extending between them, and they may be either severed directly after formation or may be treated in any desired way as by vulcanizing, buffing or cementing before being cut into separate fillers.

Having thus described my invention, I claim:

1. An intermediate product in the manufacture of clincher bead fillers consisting of a plurality of substantially parallel bead fillers held in position one to another by their outer fabric covering.

2. An intermediate product in the manufacture of separate clincher bead fillers, comprising a plurality of substantially formed bead fillers held in their parallel relation by thin webs of material.

3. A bead filler having one flat and one arched surface in which one piece of fabric covers the flat side of the filler and another piece of fabric covers the remaining surface.

4. A bead filler having one flat and one arched surface, a strip of fabric covering the flat side of the filler, and a second piece of fabric covering the arched surface, said strips affording space between them for the overflow of excess material from the body of the filler.

5. The method of making bead fillers comprising forming a sheet having parallel ribs substantially corresponding in outline to the bead fillers and thin webs of material connecting the ribs, and severing the webs between the ribs to form separate bead fillers.

6. A bead making process consisting in forming a plurality of substantially parallel rows of beads having their surfaces covered with continuous sheets of fabric.

7. A process of forming bead fillers, comprising forming rubber into the approximate shape of a plurality of adjacent bead fillers, covering the rubber with opposed sheets of fabric, and severing the fabric between the adjacent bead fillers.

8. A process of forming bead fillers, comprising forming rubber into the approximate shape of a plurality of adjacent bead fillers having the flat sides thereof disposed substantially in the same plane, covering said flat sides with a continuous sheet of fabric, folding a second sheet of fabric to substantially conform to the opposing surfaces of the adjacent bead fillers, applying said second sheet to such opposing surfaces, and severing the material between adjacent fillers.

9. A process of forming bead fillers, comprising forming rubber into the approximate shape of a plurality of adjacent bead fillers, covering the rubber with opposed sheets of fabric, forming the combined rubber and fabric into adjacent bead fillers united by the fabric, and severing the fabric between the adjacent bead fillers.

10. A process of forming bead fillers, comprising forming rubber into the approximate shape of a plurality of adjacent bead fillers having the flat sides thereof disposed substantially in the same plane, covering said flat sides with a continuous sheet of fabric, folding a second sheet of fabric to substantially conform to the opposing surfaces of the adjacent bead fillers, applying said second sheet to such opposing surfaces, forming the combined rubber and fabric to substantially final shape, and severing the material between adjacent fillers.

11. In a bead making machine, a combination of means for forming a rubber sheet, means for leading the rubber sheet thru bead forming grooves between two rollers, means for supplying and directing fabric sheets between the grooved rolls and the rubber strips, and means for cutting between the parallel beads so formed.

12. In a bead making machine, a combination of means for forming a rubber sheet having longitudinal ribs separated by relatively thin webs, means for leading the rubber sheet thru bead forming grooves between two rollers, means for supplying and directing fabric sheets between the grooved rolls and the rubber strips, and means for cutting between the parallel beads so formed.

13. In a bead making machine, a combination of two cylinders one of which has plurality of parallel grooves on its surface, means for leading rubber thru said grooves, and means for supplying a sheet of fabric between the rubber and each roller.

MELVON A. MARQUETTE.